United States Patent [19]

Nothmann

[11] 4,080,060

[45] Mar. 21, 1978

[54] COPY SYSTEM

[75] Inventor: Gerhard A. Nothmann, Wilmette, Ill.

[73] Assignee: Addressograph-Multigraph Corporation, Cleveland, Ohio

[21] Appl. No.: 771,104

[22] Filed: Feb. 23, 1977

Related U.S. Application Data

[63] Continuation-in-part of Ser. No. 601,026, Aug. 1, 1975, abandoned.

[51] Int. Cl.[2] .................. G03B 27/32; G03B 27/52

[52] U.S. Cl. .................. 355/23; 355/77

[58] Field of Search .................. 355/23-26, 355/11, 14, 16, 64, 65, 77

[56] References Cited

U.S. PATENT DOCUMENTS

| | | | |
|---|---|---|---|
| 3,615,129 | 10/1971 | Drawe et al. | 355/26 X |
| 3,844,654 | 10/1974 | Guenther | 355/24 |
| 3,856,295 | 12/1974 | Looney | 355/24 X |
| 3,862,802 | 1/1975 | Till | 355/23 |
| 3,869,202 | 3/1975 | Tabata et al. | 355/23 X |

*Primary Examiner*—Donald A. Griffin
*Attorney, Agent, or Firm*—Russell L. Root

[57] ABSTRACT

An improved copy system includes a document feeding apparatus which is effective to move a document to an imaging station. An image on one side of the document is then projected on an electrostatically charged sheet to form a first master. The document is then transferred to an inverting mechanism which is effective to turn the document over and return it to the imaging station. A second master is then formed. The masters are sequentially transferred to a duplicating section which includes a printing unit. The printing unit utilizes the masters to print on one side of a sheet of material as it passes through a printing nip. During a printing operation, blank sheets are sequentially fed from a supply pile through the printing nip and the first master is utilized to print images on first or front sides of the sheets. The sheets which have been printed on only one side are then sequentially deposited in a hopper. After the sheets have been printed on one side, the first master is ejected from the printing unit and the second master is transferred to the printing unit. The sheets which have been printed on one side are then sequentially fed from the bottom of the hopper to the printing unit. As the sheets again pass through the printing nip, an image corresponding to the image on the second side of the document is printed on the second or back sides of the sheets. The equipment also exhibits features providing for printing sheets on both sides and for safe handling of the freshly printed sheets without smudging when the duplicator is of a type which employs wet ink in forming the copies.

21 Claims, 6 Drawing Figures

COPY SYSTEM

CROSS-REFERENCE

This application is a continuation-in-part of my application, Ser. No. 601,026, filed Aug. 1, 1975 and now abandoned.

BACKGROUND OF THE INVENTION

This invention relates to a copying system, and more particularly to a copying method and apparatus to copy material on opposite sides of a document on opposite sides of a sheet of material.

Copy systems for business and print shop reproduction of documents, including multi-page documents, are well known. Typically, these include an automatic document feeder, an electrostatic master imager and converter, a lithographic duplicator, and a collator. When equipped in this manner, no operator involvement is needed from the insertion of the original multi-page document to the removal of the reproduced assemblies of duplicated documents from the collator.

This type of equipment could also be used for reproducing double-sided documents. To this end, the collator is initially used in a "collect" mode, i.e. with each pocket collecting all duplicated copies from one original/master. After all the first sides (typically all odd-numbered pages) of a document are duplicated in this manner, the operator then re-inserts the original document, turned over in the document feeder, collects the duplicated copies from the collator and re-inserts them into the copy paper feeder. For the second, final run of the system, the second sides (typically all the even-numbered pages) of a document are duplicated on the blank sides of the sheets. During the second run, the collator is advantageously used in the "collate" mode. This method of operation serves the purpose of reproducing double-sided documents but requires operator actions between the first and second runs, and demands skill and attention to assure that the orientation and sequence of the pages is correct.

Systems are also known for two-side printing of documents prior to collation. In one type of system, each set of one-side printed sheets is collected in the printing machine and after the second side of the original document is exposed, this set of sheets is passed through the machine a second time for printing on the second side, after which they are forwarded to the collator. In a second type of system, two-side printing takes place in one pass of each sheet through the machine and it can be collated immediately. The first of these types of systems has been used on xerographic copying machines, and as such requires manual positioning of the original document just prior to each passage of the copy sheets through the machine. Compatible automatic document feeding is not known for this type of system. The second type of system requires significantly greater machine investment and is not readily adaptable to automatic feeding of the original document.

SUMMARY OF THE PRESENT INVENTION

The present invention overcomes the problems set forth above by providing a copying method and apparatus which enables automatic high-speed feeding, duplicating, and collating of two-sided multi-page documents. To accomplish this, the copy system of the present invention advantageously includes a mechanism for inverting the original documents in conjunction with a known document feeder and a mechanism for inverting the duplicated copies for printing on the second side and subsequent collating. This is accomplished by automatic mechanism which, in contrast to known mechanisms for this purpose, perform their functions with devices which are relatively simple and reliable in operation.

Accordingly, it is an object of this invention to provide a new and improved system for copying both sides of a document on opposite sides of a sheet of material.

Another object of this invention is to provide a new and improved copying system which is effective to print on one side of each of a series of sheets of material as they pass through a printing nip, deposit the sheets of material in a hopper, and feed the sheets of material from the hopper back to the printing nip in an orientation such as to enable printing to occur on the opposite or blank sides of the sheets of material.

Another object of this invention is to provide a new and improved copying system having a document feed assembly for feeding a document to an imaging station with a first side of the document facing a master producting apparatus, and an inverter to change the orientation of the document to an orientation in which a second side of the document faces the master producing apparatus to thereby enable the master producing apparatus to make masters having images thereon corresponding to the opposite sides of the document.

A further object of the invention is the provision of duplicating equipment of the type which uses wet ink in forming the copies, which is capable of printing on both sides of the copy sheet, and which has means for so handling the copy sheets between printings that the side first printed is protected against smudging until the ink has time to set sufficiently to become smudge resistant.

BRIEF DESCRIPTION OF THE DRAWINGS

The foregoing and other objects and features of the present invention will become more apparent upon the consideration of the following description taken in connection with the accompanying drawings wherein.

DESCRIPTION OF SPECIFIC PREFERRED EMBODIMENTS OF THE INVENTION

General Description

Figure 1:
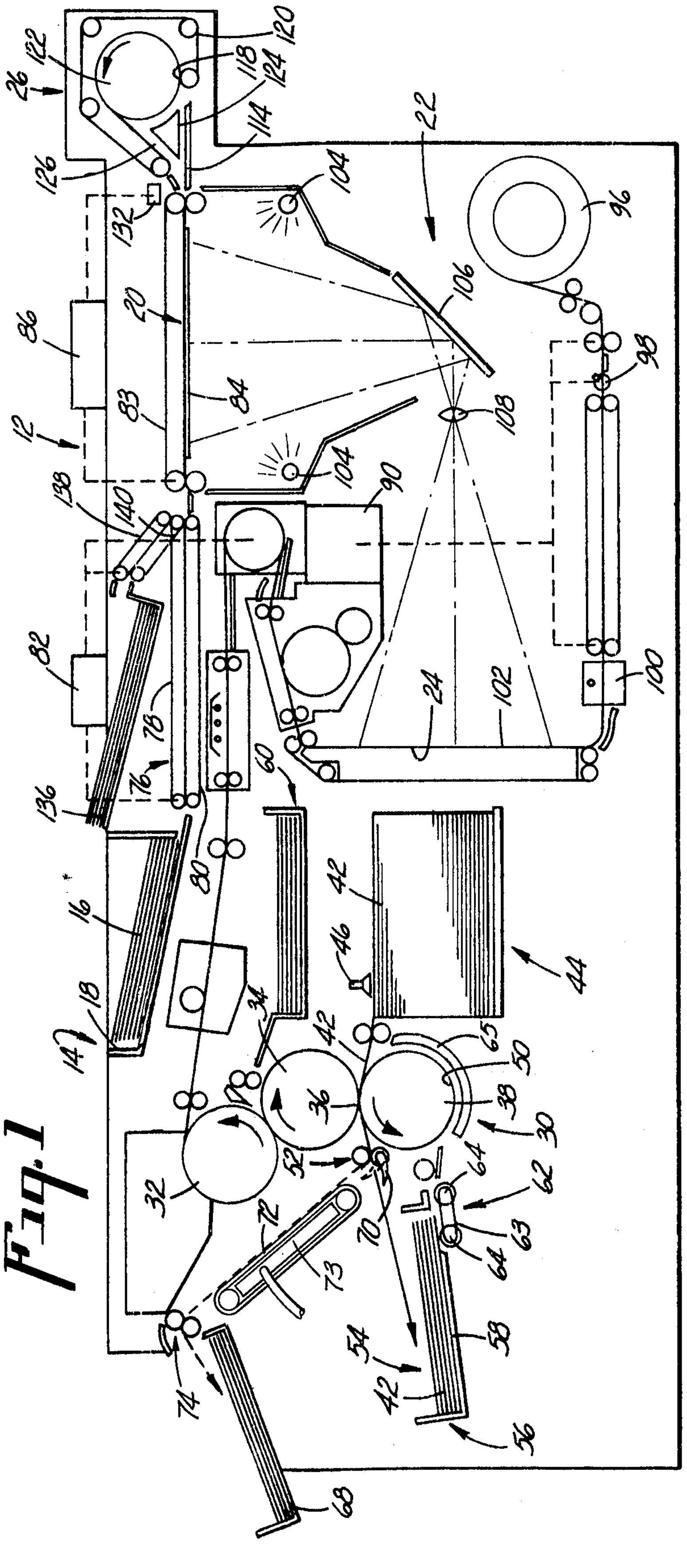
FIG. 1 is a schematic illustration of a document copying apparatus constructed in accordance with the present invention.

An improved copying apparatus 10 includes a document imaging and master reproducing section 12 and a duplicating section 14. The document imaging and master producing section 12 is effective to feed a document 16 from a document supply hopper 18 to an imaging station 20. A master producing apparatus 22 is effective to transmit an image of a document at the imaging station 20 to an electrostatically charged sheet 24 to thereby form a first master having an image corresponding to the image on the first side of the document. The document 16 is then transported to an inverter assembly 26 which changes the orientation of the document and causes it to be returned to the imaging station 20 with the opposite or second side of the document facing toward the master producing apparatus 22. The master producing apparatus 22 is then activated to produce a second master having an image formed thereon corresponding to the image on the second or opposite side of the document. These two master sheets are used, in turn, by the duplicating section 14 to print on opposite sides of a blank sheet of material.

The duplicating section 14 includes a printing unit 30 having a master or plate cylinder 32 which cooperates with a blanket or image transfer cylinder 34 to apply ink to the upwardly facing side of a sheet of material passing through a printing nip 36 formed between the ink transfer cylinders 34 and the impression cylinder 38. Blank sheets 42 are fed from a pile or stack 44 of sheets to the printing nip 36 by a known sheet feed mechanism 46. As a blank sheet 42 passes through the printing nip 36, the blanket cylinder 34 prints an image on the upwardly facing or first side surface of the sheet corresponding to the image on the first master which is disposed on the master cylinder 32. The opposite or downwardly facing side of the sheet 42 is supported by the cylindrical outer surface 50 of the impression cylinder 38. After the sheet 42 has passed through the printing nip 36, it is engaged by copy sheet ejector rollers 52 which convey the sheet toward the open upper end portion 54 of a hopper 56. The sheet 42 is then deposited in a stack in the hopper 56 with the freshly printed side of the sheet facing upwardly and the blank side of the sheet facing downwardly toward a bottom wall 58 of the hopper 56.

Figure 5:
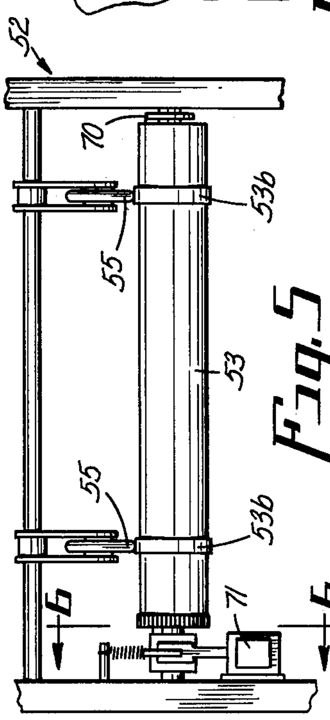
FIG. 5 is a detail elevation, to a larger scale, of the copy ejector rolls, taken looking toward the left in FIGS. 1 and 4.

As will be readily understood, when the duplicating section 14 is of the type using wet ink for printing, as in the case of a lithographic duplicator, the copy sheet ejecting rollers 52 will be configured in the conventional manner shown in FIG. 5, wherein a metal roller 53 is provided with axially adjustable spring rings 53*b*. These cooperate with axially adjustable metal wheels 55 to grasp an issuing sheet by its image-free margins and forward it directly to the hopper without disturbing the freshly inked image areas.

The use of ejector rollers such as 52 is conventional in lithographic duplicators and, although the lower roller 53 is positively driven, they serve mainly as a guide means to make certain that the sheets are accurately deposited into the receiver or hopper as the printing nip itself feeds them forward. For the purposes of this description and the subjoined claims, this type of construction is considered to be feeding directly from the printing nip to the receiver or hopper inasmuch as any contact with the image on the freshly imprinted surface is avoided.

When the desired number of sheets have been printed with an image corresponding to the image on the first side of the document, the first master is automatically removed from the master cylinder 32 and transferred to a master sheet receiving tray 60. The second master is then automatically positioned on the master cylinder 32. The second master is formed with an image corresponding to the image on the second or backside of the document and is utilized to print on the blank back or second sides of the sheets 42. After this has been done, the sheets 42 will have front and back sides with images printed thereon corresponding to the images on two sides of a document from which the two masters were made.

To enable the printing assembly 30 to print on the blank backsides of the sheets 42, a sheet feed mechanism 62 feeds the sheets 42 from the bottom of the hopper 56. Although other types of sheet feed mechanisms could be used, the illustrated sheet feed mechanism 62 includes a feed belt 62 which engages the blank backside of a sheet at the bottom of the hopper 56. The belt 63 is moved in a clockwise direction (as viewed in FIG. 1) about sprockets 64 to move the leading edge of a sheet into engagement with the lower portion of the impression cylinder 38. At this time, the previously printed image on the upper side of the sheet is disposed in abutting engagement with the cylindrical outer surface 50 of the impression cylinder 38 while the blank lower side of the sheet will be facing outwardly toward a sheet guide 65. The impression cylinder 38 is then effective to feed the sheet through the printing nip 36. As this occurs, the blanket cylinder 34 prints on the second or backside of the sheet an image corresponding to the image on the second or backside of the document.

Figure 6:
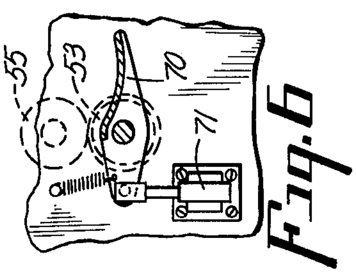
FIG. 6 is a section on line 6—6 of FIG. 5 showing the gate means associated with the copy sheet ejector rollers, the location of which is indicated in phantom.

Once a sheet has twice passed through the printing nip 36 and has been printed on opposite sides with images corresponding to the images on the opposite side of a document 16, the sheet is transmitted to a receiver 68. To direct the printed sheet toward the receiver 68, a gate 70 is rotated in a clockwise direction from the position shown in FIG. 1, for example by activation of the solenoid 71 (FIGS. 5 and 6), to direct the printed sheet upwardly toward a feed mechanism 72, preferably consisting of transport belts, to which the sheets are held by a vacuum plenum 73. The belts introduce the sheet to rollers 74, comparable to the ejector rollers 52, for passing the sheets to the receiver 68. Of course, rather than being directed to a receiver 68, the sheets 42 could be selectively directed to a suitable collating apparatus by a gate similar to gate 70.

DOCUMENT FEEDING AND INVERTING APPARATUS

Documents 16 are fed from the document supply tray 18 to the imaging station 20 by a document feed apparatus 76. The document feed apparatus 76 includes a pair of belts 78 and 80 having drive rollers which are driven under the control of the document feed control apparatus 82. Thus, the document 16 is transferred from the document supply tray 18 toward the right (as viewed in FIG. 1) by the belts 78 and 80 which engage opposite sides of the document. The belts 78 and 80 direct the documents into engagement with a feed belt 83 which extends across a platen 84 at the imaging station 20. When the document has been centered on the platen 84, a control apparatus 86 interrupts operation of the document feed belt 83. A control apparatus 90 in the master producing section 22 then effects operation of master sheet feeding apparatus 94 to feed a master sheet severed from a web 96 by a suitable knife 98 through an electrostatic charging station 100. The electrostatically charged sheet is then conducted to an exposure station 102. Suitable lights 104 are then energized to cause an image on the lower side of the document to be projected by way of a mirror 106 and lens 108 onto the electrostatically charged master sheet 24. The electrostatically charged master sheet 24 is then processed in a known manner to enable it to be utilized by the printing unit 30.

After this has occurred, the document 16 is transferred from the imaging station 20 to the inverter mechanism 26. The inverter mechanism 26 is effective to turn the document over so the second or backside of the document will face the platen 84 when the document is returned to the imaging station 20. Thus, upon completion of forming of the first master, the controls 86 activate the belt 83 to move the master rightwardly across the platen 84 into the inverting mechanism 26.

As the leading end of the master enters the inverting mechanism 26, it is moved along a guide plate 114 (FIG. 2) to a nip 118 formed between a feed belt 120 and the cylindrical outer surface of an inverter roll 122. The inverter roll 122 is rotated in a counterclockwise direction (as viewed in FIGS. 1 and 2) so that the document is conveyed from an entrance area 124 around the roll 122 to an exit area 126. The inverter roll 122 is of a size such that before the leading end of the document reaches the exit area 126, the trailing end of the document has moved into the entrance area 124. At this time, a detector 132 (FIG. 1) detects the absence of a sheet in the area between the platen 84 and the inverter mechanism 26.

Upon the detection of the absence of a sheet between the platen 84 and the inverter mechanism 26, the control 86 effect a reversal in the direction in which the belt 83 is driven. Therefore, as the leading end of the document moves from the exit area 126 back into engagement with the belt 83, the belt is effective to move the document leftwardly (as viewed in FIG. 1) across the platen 84 to position the document at the imaging station 20. When the document is in the proper position at the imaging station 20, the controls 86 interrupt movement of the belt 83. At this time, the document is centered relative to the platen 84 and the back or second side of the document is facing downwardly toward the master producing apparatus 22 while the previously imaged or first side of the document is facing upwardly away from the platen 84. This orientation of the document is due to the fact that it moves through the inverter 26 along a path which doubles back on itself around the inverting roll 122.

When the document has been positioned on the platen 84 with the second or backside of the document exposed to the master producing apparatus 22, the controls 90 effect operation of the master producing apparatus to move a second electrostatically charged master sheet to the exposure station 102. The lights 104 are again energized and an image corresponding to the image on the back or second side of the document if formed on a second master sheet 24. After this has been done, the document is conveyed to a receiving bin 136 by a pair of document feed belts 138 and 140. Thereafter, the controls 82 begin to effect operation of the document feed apparatus 76 to feed a second document to the imaging station 20. It should be noted that the feeding of the documents to the imaging station 20 to the inverting apparatus 26 after the first side of the document has been imaged, inverting of the document, and returning it to the imaging station 20 is accomplished automatically without the necessity of handling of the document by an operator.

DUPLICATING SECTION

Each of the masters corresponding to the two sides of the document are sequentially utilized by the printing unit 30 in the duplicating section 14. To this end, the plate or master cylinder 32 is provided with a plurality of grippers which are automatically actuated to engage and hold the first master on the master cylinder 32. The master cylinder grippers remain closed until the desired number of blank sheets 42 have been imprinted on one side with images corresponding to the images on the first or front side of the document. The master cylinder grippers are then opened and the first master is fed to the bin 60. The grippers on the master cylinder 32 then engage and hold the second master while the second or backsides of the sheets 42 are printed. When the second or backsides of the sheets 42 have been printed, the master cylinder grippers are opened and the second master is deposited in the bin 60 on top of the first master.

Upon initiation of the printing of the first or front side of the blank sheet 42, the grippers associated with the impression cylinder 38 must open immediately ahead of the printing nip 36 to enable the sheet feed apparatus 46 to feed a blank sheet 42 to the open grippers. Thereafter, the impression cylinder grippers must close and remain closed until the leading end of the sheet has passed through the printing nip 36 and is in a position to be engaged by the copy sheet ejection rollers 52. When the second or backside of a sheet is to be printed, the grippers on the impression cylinder 38 must be opened to enable the sheet feed mechanism 62 to feed the leading end of a sheet into the opened grippers at a location which is more or less opposite from the location in which the grippers engage the blank sheet fed from the pile 44.

To effect operation of the grippers on the impression cylinder to handle either sheets fed from the pile 44 or from the hopper 56, a stationary cam 146 (FIG. 3) is associated with the impression cylinder 38. The grippers 150 (FIG. 3) are mounted on the impression cylinder 38 for rotation therewith and are connected with a cam follower 152. During operation of the printing apparatus 30 to print on the first side of a blank sheet 42 fed from the pile 44, a shield or mask 156, pivoted at 184 to the cam 146, is moved from the active position shown at solid lines in FIG. 3 to the retracted position shown in dashed lines in FIG. 3. To this end, a solenoid 158 is connected with the mask 156 by a linkage 160. The linkage 160 is of the toggle type and includes a first link 162 which is pivotally connected at 164 to the mask 156 and is pivotally connected at its opposite end with a main or knee joint 165. A lower link 168 is pivotally connected at one end to the link 162 at the main joint 165 and is pivotally connected at its opposite end with fixed or stationary bracket 170. The solenoid 158 has its plunger connected directly to the main joint 165 and, upon actuation of the solenoid 158 from the extended position shown in solid lines in FIG. 3 to the retracted position shown in dash lines in FIG. 3, the toggle linkage 160 is actuated to retract the mask 156.

Figure 3:
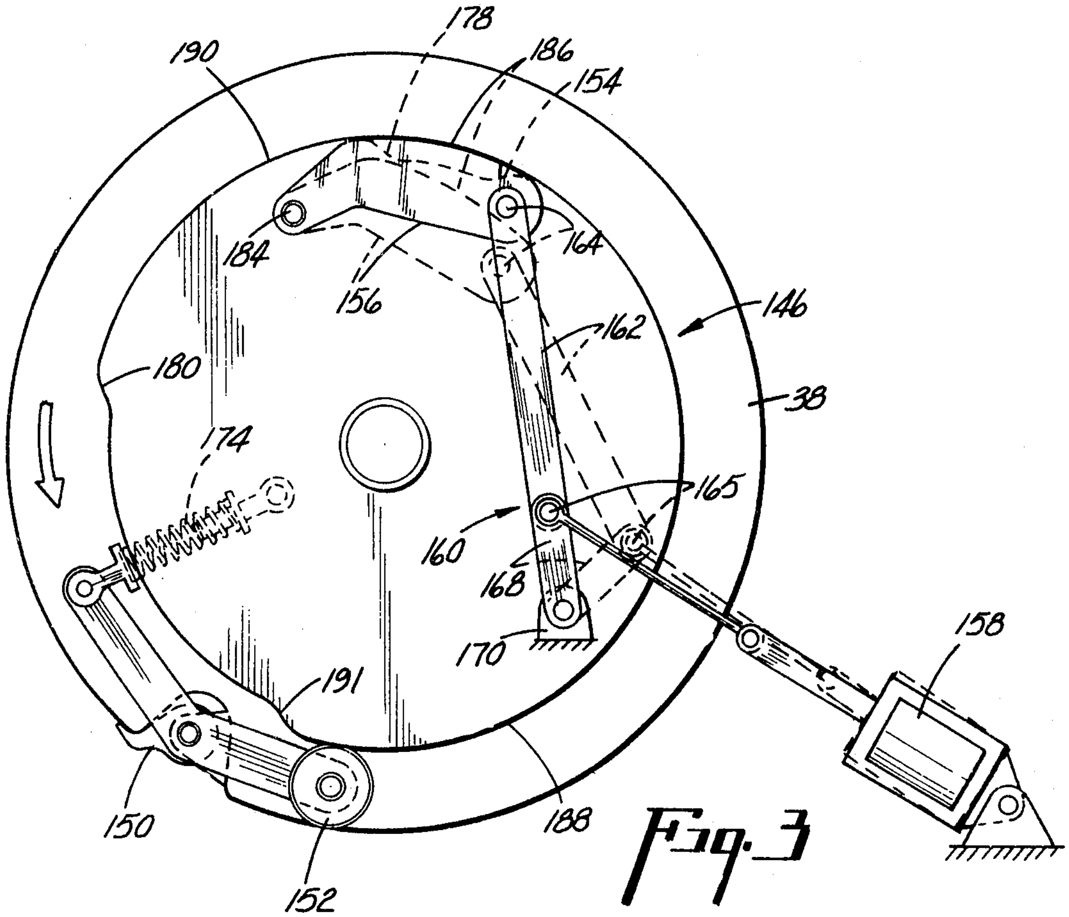
FIG. 3 is an enlarged schematic illustration depicting the construction of a double-action gripper control system utilized in association with a printing apparatus in a duplicating section of the copying apparatus.

As the impression cylinder 138 continues to rotate in a counterclockwise direction relative to the cam 146 from the position shown in FIG. 3, the grippers 150 remain closed until the cam follower roller 152 engages an inwardly sloping surface 154 of the cam 146. As the cam follower 152 moves radially inwardly, a biasing spring 174 actuates the grippers 150 to the open position so that they can receive a blank sheet fed from the pile 44 by the sheet feed mechanism 46.

After the leading end of a blank sheet has been engaged by the grippers 150, the cam follower 152 encounters a radially outwardly sloping cam surface 178 which causes the cam follower 152 to move outwardly during the continued rotation of the impression cylinder 38. This causes the grippers 150 to close so that the blank sheet 42 is positively pulled through the printing nip 36. Continued rotation of the impression cylinder 38 moves the cam follower 152 into engagement with a second radially inwardly sloping section 180 of the cam 146. When the cam follower 152 reaches the radially inwardly sloping section 180 of the cam 146, the grippers 150 are opened to release the sheet so that it can be fed to the receiving hopper 56.

During operation of the printing apparatus 30 to print on the back or second sides of the sheets 42, it is necessary for the grippers 150 to sequentially engage the sheets as they are fed from the hopper 56 and to remain closed until after the leading edge of each sheet in turn has moved through the printing nip 36. To prevent undesired opening of the grippers 150 adjacent to the pile sheet feed mechanism 46, the solenoid 158 is deenergized and allowed to expand by its own spring action to the extended position, illustrated in solid lines in FIG. 3, to thereby swing the mask 156 about its pivot 184 to the active position shown in solid lines in FIG. 3. When the mask 156 is in the active position, an arcuate outer surface 186 of the mask 156 forms a continuation of the circular cam surfaces 188 and 190. The cam follower roller 152 is wide enough to engage either the cam surfces 188 and 190 or the arcuate outer surface 186 of the mask 156. Therefore, the mask is effective to hold the cam follower outwardly so that the grippers remain closed until after the gripped lead edge of the sheet has passed through the printing nip and until the cam follower 152 engages the inwardly sloping portion 180 of the cam 146.

The cam 146 is provided with a radially outwardly sloping portion 191 which causes the grippers 150 to close after the leading end of a sheet has been fed from the hopper 56 into the grippers by the sheet feed mechanism 62.

It will also be noted that during operation of the printing apparatus 30 to print on the first or front side of a blank sheet 42, the outwardly sloping portion 190 of the cam 146 will cause actuation of the grippers 150. However, this actuation is idle since the sheet feed mechanism 62 is at that time automatically rendered inoperative and does not feed sheets to the grippers, so that the grippers will not engage a sheet.

Although only the gripper actuating cam 146 for the impression cylinder grippers 150 has been fully described in connection with FIG. 3, it should be understood that the master cylinder 32 is provided with a conventional cam mechanism to effect operation of grippers on the master cylinder 32 in the usual manner to sequentially engage the first and second masters corresponding to the opposite sides of a document.

SECOND EMBODIMENT OF THE INVENTION

Figure 2:
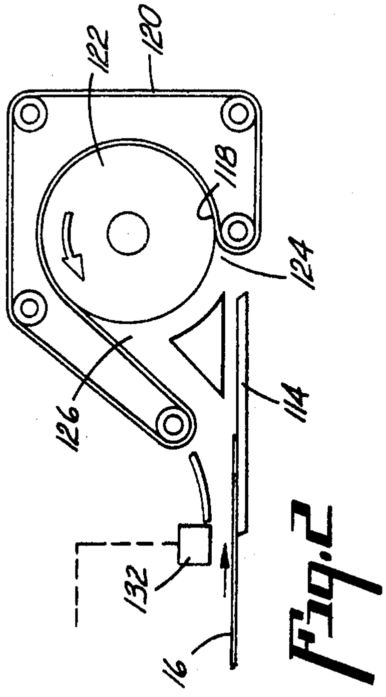
FIG. 2 is an enlarged fragmentary sectional view of an inverting mechanism utilized in a document imaging and master producing section of the copying apparatus.

In the embodiment of the invention illustrated in FIGS. 1-3, the sheets 42 are conveyed to the receiving tray 68 after an image has been printed on both sides of the sheets. This is accomplished by moving the deflector gate 70 in a clockwise direction from the position shown in FIG. 1 so that the gate is effective to deflect the leading end of the sheets to the feed mechanism 72. In the embodiment of the invention illustrated schematically in FIG. 4, the sheets are returned directly to the hopper from which they were fed by the bottom feed mechanism. Since the embodiment of the invention illustrated in FIG. 4 is generally similar to the embodiment of the invention illustrated in FIG. 1, similar numerals will be utilized to illustrate similar components, the suffix letter "*a*" being associated with the elements of FIG. 4 in order to avoid confusion.

Figure 4:
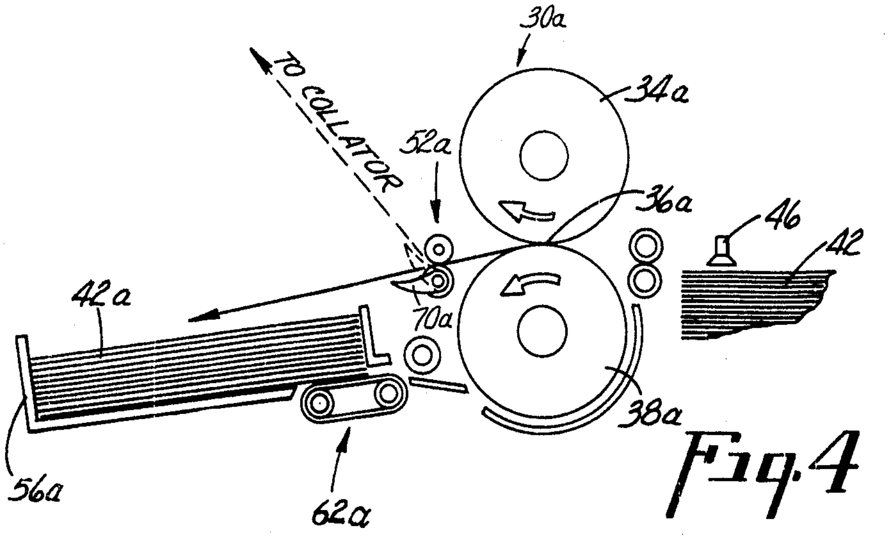
FIG. 4 is a schematic illustration depicting a second embodiment of the invention.

In the embodiment of the invention illustrated in FIG. 4 the document imaging and master producing section is the same as is illustrated in FIG. 1. Therefore, this section of the apparatus has not been illustrated in FIG. 4 or described in connection therewith. In addition, many of the elements in the duplicating section of the embodiment of the invention illustrated in FIG. 4, are the same as are illustrated in connection with FIG. 1. Accordingly, the elements which are the same in both embodiments of the invention have not been illustrated in FIG. 4.

In the embodiment of the invention illustrated in FIG. 4, the sheets **42*a*, after having been printed on the first side, at the nip 36*a*, are fed from an impression cylinder 38*a* directly to a receiving hopper 56*a* via the copy sheet ejecting rollers 52*a*. The downwardly facing sides of the sheets in the hopper 56*a* are blank. When a second master having an image thereon corresponding to the back or second side of the document has been received by the printing apparatus 30*a*, the sheets 42*a* are fed from the hopper 56*a* by a sheet feed mechanism 62*a*. As the sheets are moved through the printing nip 36*a* by the impression cylinder 38*a***, the opposite or backside of the sheet is printed with an image corresponding to the image on the backside of the document.

In accordance with a feature of this embodiment of the invention, the sheets are returned to the hopper **56*a* after both sides of the sheets have been printed. Thus, in the embodiment of the invention illustrated in FIG. 4, the sheets are deposited in the hopper 56*a* twice, that is once after they are printed on the first side by the first master and once after they are printed on the second side by the second master. When all of the sheets 42*a* have been fed from the hopper 56*a* and through the printing nip 36*a* for a second time so that the stack of sheets in the hopper 56*a* have all been printed on both the front and back sides, operation of the printing assembly is interrupted and the sheets are removed from the hopper 56*a*. It is contemplated that the embodiment of the invention illustrated in FIG. 4 may be preferred under certain conditions since it eliminates the need for the gate 70 (FIG. 1) and the controls for actuating the gate. On the other hand, if a gate 70*a* should be provided, as shown in FIG. 4, it can serve to optionally direct the sheets, as they come from their second printing, either to a collator or distributor or back to the hopper 56*a*. As compared with the previously described arrangement, this makes it possible to include selectively active sheet collector means (hopper 56*a***), and collating or distributing means, while still employing only one gate mechanism.

While not contemplated for ordinary use, since the hopper 56 or **56*a* will generally be designed to hold a limited supply of sheets, it will be readily understood that in certain circumstances it would be feasible, if convenient, to place the intial stack of unprinted paper, if small enough, in the hopper 56 or 56*a*, and allow the sheet feed means 62 or 62*a*** to feed the sheets twice through the printing nip from this cource, changing the master image after all sheets have gone through once.

The arrangement for handling sheets during printing on both sides is of particular interest since it allows for such handling without danger of smudging or tracking when the printing is done with wet ink as in the case of the conventional lithographic process. It will be noted that on the first printing pass the sheet is passed directly from the printing nip to the receiving hopper 56 or 56*a* encountering only the ejector rollers 52 or 52*a* on the way so that no smudging or tracking problem is encountered. The sheets are then allowed to rest in the hopper for a period of time while the printing run is continuing before it is necessary to handle them again. This allows the ink on the sheets to partially dry, perhaps to some extent by absorption into the paper, but in any case by "setting" or congealing of at least the surface stratum of the ink deposit. When the printing of the first side of all sheets is complete, and it is time to feed the sheets to the printing nip a second time, they are fed from the end of the stack having the sheets first printed, i.e. the bottom of the stack so that the maximum setting period is afforded each sheet before it is fed the second time.

While the mechanism for handling copy paper to produce sheets with impressions on both sides is shown as adapted for use especially with a lithographic duplicator, it will be understood that it is readily applicable for use with other types of printing or reprographic equipment as well, of which one example would be xerographic printing.

In view of the foregoing description, it can be seen that the copying apparatus 10 includes a document imaging and master reproducing section 12 having an inverting mechanism 26 which automatically inverts the documents so that first and second master sheets having images thereon corresponding to opposite sides of the document can be automatically prepared. The master sheets are then utilized by a printing unit 30 which is effective to print an image on a first side of a blank sheet 42 the first time it is fed through a printing nip 36 to thereby print an image on the sheet corresponding to the first side of the document. The second time the sheet is fed through the printing nip the second or backside of the sheet is printed with an image corresponding to the image on the second or backside of the document. Although it is contemplated that the document imaging and master producing section 12 and copying section 14 may advantageously be utilized separately in different machines, they are particularly well adapted for use together in order to copy opposite sides of a document on opposite sides of a blank sheet of paper with a minimum of operator handling.

Furthermore, the present invention is seen to provide a means for printing copy sheets on both faces with wet ink impressions by passing the same twice through the same printing nip, including means for so handling the sheets that danger of smudging or tracking of either image, and particularly the first image, is avoided.

What is claimed is:

1. Printing apparatus comprising:

an imaging station;

support means at said imaging station for supporting a document to be reproduced with a face thereof presented in an exposure direction;

master producing means for producing a master having an image thereon corresponding to the image on the side of the document facing the exposure direction;

printing means including a master cylinder;

means for feeding a master produced by the master making means to the master cylinder for the production of printed copies therefrom;

a copy sheet supply source;

means for feeding a document to said support means with its first face in exposure position and with one end oriented in a first direction relative to the support means during preparation of the first master;

an inverter for turning the document over after said first face exposure and feeding it to the support surface with its second face presented in an exposure direction and with the first said one end of the document oriented relative to the support means in second direction opposite to that occupied during exposure of the first face;

means for feeding copy sheets from said supply source to said printing means to receive a first impression on one face from a master produced from a first face of said document at said imaging station; and means for inverting the copy sheets printed on one face by masters produced from said first document face, and presenting them to the printing means with their other faces oriented in print receiving direction and with the edge thereof which was trailing during the first printing impression now in leading position so as to receive from the second master an impression oriented in a direction comparable to that on the first face of the copy sheet.

2. Printing apparatus comprising:

means for printing on one side of a sheet of material at a time, said printing means including a printing element at a printing station through which a sheet passes to receive an impression;

hopper means for receiving sheets of material directly from said printing means, said hopper means including means for supporting the sheets of material in a stack with first sides having images printed thereon facing in a first direction and second sides on which images are to be printed facing in a second direction;

sheet feed means for feeding sheets of material from said hopper means to said printing station, said sheet feed means including means for moving each sheet in turn first through a turnover path whereby it can present its unprinted face to the printing element and then to said printing station where the second printing impression is received from the printing element on the second side of each such sheet after having been printed on the first side thereof;

master producing means for transmitting an image to a master corresponding to the image on a document;

support means for supporting a document with one side of the document facing toward said master producing means;

document feed means for feeding a document to said support means with a first side of the document facing said master producing means to enable said master producing means to make a first master having an image corresponding to the image on the first side of the document;

master feed means for feeding said first master to said printing means to enable said printing means to print on the first sides of the sheets of material images corresponding to the image on the first side of the document; and inverter means for changing the orientation of the document on said support means to an orientation in which a second side of the document faces said master producing means; said master producing means being effective to make a second master having an image corresponding to an image on the second side of the document, and said master feed means including means for feeding the second master to said printing means after said printing means has printed on the first sides of the sheets of material to enable said printing means to print on the second sides of the sheets of material images corresponding to the image on the second side of the document.

3. A method of printing comprising the steps of:

sequentially feeding sheets of material into operative relation to a printing means at a printing station with a first side of each sheet of material facing toward the printing means;

printing on the first side of each of the sheets of material in turn as they pass through the printing station;

depositing each of the sheets of material in turn in a stack in a hopper means after the sheet of material has passed through the printing station and has been printed on the first side;

sequentially feeding each of the sheets of material from the stack of sheets in the hopper means along a turnover path so as to present its unprinted face in print receiving position and then feeding it through the printing station with the second side of each such sheet of material facing toward the printing means and printing on the second side of each of the sheets of material in turn as they pass through the printing nip for the second time; and sequentially returning each of the sheets of material to the stack of sheets in the hopper means after performing said step of printing on the second side of each of the sheets of material.

4. A method of printing comprising the steps of:

sequentially feeding sheets of material into operative relation to a printing means at a printing station with a first side of each sheet of material facing toward the printing means;

printing on the first side of each of the sheets of material in turn as they pass through the printing station;

depositing each of the sheets of material in turn in a stack in a hopper means after the sheet of material has passed through the printing station and has been printed on the first side;

sequentially feeding each of the sheets of material from the stack of sheets in the hopper means along a turnover path so as to present its unprinted face in print receiving position and then feeding it through the printing station with the second side of each such sheet of material facing toward the printing means and printing on the second side of each of the sheets of material in turn as they pass through the printing nip for the second time;

moving a document to an imaging station with a first side of the document facing in a first direction;

making a first master having a first image thereon corresponding to an image on the first side of the document;

utilizing said first master to effect a printing of an image on the first side of each of the sheets of material during said step of printing on the first side of each of the sheets of material and which image corresponds to the image on the first side of the document;

changing the orientation of the document at the imaging station to an orientation in which a second side of the document faces in the first direction;

making a second master having a second image thereon corresponding to the image on the second side of the document; and utilizing said second master to effect a printing of an image on the second side of each of the sheets of material during said step of printing on the second side of each of the sheets of material and which image corresponds to the image on the second side of the document.

5. Printing apparatus comprising:

an imaging station;

support means at said imaging station for supporting a document with one side of the document facing in a first direction and another side of the document facing in a second direction;

master producing means for producing a master having an image thereon corresponding to the image on a side of a document disposed at said imaging station and facing in said first direction;

document feed means for feeding a document onto said support means at said imaging station with a first side of the document facing in said first direction to enable said master producing means to make a first master having an image thereon corresponding to the image on the first side of the document;

inverter means for changing the orientation of the document on said support means to an orientation in which the second side of the document faces in the first direction, said master producing means being effective to make a second master having an image corresponding to an image on the second side of the document when the second side of the document is facing in the first direction;

means for receiving masters from said master producing means and for printing on one side of a sheet of material an image corresponding to an image on a master received from said master producing means, said printing means including a plurality of rotatable cylinders at least some of which cooperate to define a printing nip;

master feed means for feeding said first and second masters in turn to said printing means;

means associated with a first one of said cylinders for effecting the printing of an image corresponding to the image on the first master on a first side of a sheet of material as it passes through the printing nip, said plurality of cylinders including a second cylinder having surface means for engaging a second side of the sheet material opposite from said first side as the sheet of material passes through the printing nip;

hopper means for receiving sheets of material from said printing means and including means for supporting the sheets of material in a stack with the first sides having images printed thereon facing in one direction and the second sides on which images corresponding to the image on said second master are to be printed facing in another direction; and sheet feed means for feeding sheets of material from said hopper means to said printing means, said sheet feed means including means for sequentially moving the first sides of the sheets of material on which an image corresponding to the image on said first master has been printed into engagement with said surface means; said printing means thereupon being effective to sequentially move sheets of material as they are fed from said hopper, through the printing nip with the first sides of the sheets of material in engagement with said surface means on said second cylinder, and to effect printing of the second sides of the sheets of material as they move through the printing nip with images corresponding to that on the second master.

6. An apparatus as set forth in claim 5 wherein said inverter means includes means for moving the document along a path length in a direction away from the imaging station with the first side of the document facing in the first direction and for moving the document along the path length in a direction back toward the imaging station with the second side of the document facing in the first direction; and means for moving the document along a turn-around path length having an entrance portion through which the document moves from said path length and an exit portion through which the document moves toward said path length.

7. An apparatus as set forth in claim 5 wherein said sheet feed means includes means for sequentially engaging the second side of each of the sheets in said hopper means to feed each of the sheets in turn from said hopper means.

8. An apparatus as set forth in claim 5 wherein as the sheets are printed on the second side they are sequentially deposited in the hopper means on top of the stack of sheets in the hopper means and wherein said sheet feed means includes means for sequentially feeding sheets from the bottom of the stack of sheets in said hopper means.

9. Printing apparatus comprising:

an imaging station;

means for feeding a two-sided original document to the imaging station with a first face oriented in an imaging direction;

means for removing the document from the imaging station, inverting the document and restoring it to the imaging station with the second face oriented in imaging direction;

means for so feeding sheets of master material in sequence to a position for receiving images of the faces of the original document that a first master sheet receives the image of the first face of the original and a second master sheet receives the image of the second face of the original;

duplicator means comprising a printing cylinder and an impression cylinder forming a printing nip having an input side and an exit side;

means for forwarding the imaged master sheets in sequence to the duplicator means;

means for providing a supply of copy sheets and for feeding them seriatim to the printing nip to receive on a first face of each an image corresponding to that on the first master;

means for storing copy sheets as they issue from the printing nip after receiving said first impression; and means for feeding copy sheets out of said storing means, inverting them and refeeding them through the printing nip to receive images corresponding to that on the second master.

10. Printing apparatus as set forth in claim 9 in which the means for providing a supply of copy sheets comprises a holder for supporting the copy sheets in substantially horizontal position adjacent the input side of the nip, and in which the storing means comprises a receiver for holding the copy sheets in a substantially horizontal position adjacent the exit side of the nip.

11. Printing apparatus as set forth in claim 10 in which the means for feeding the copy sheets out of the storing means includes means for feeding from the bottom of the stack of copy sheets held in the storing means.

12. Printing apparatus as set forth in claim 10 in which the impression cylinder includes a gripper for grasping the lead margin of copy sheets, and in which the means for inverting the copy sheets and refeeding them through the nip comprises said gripper and means for actuating said gripper to grasp the margin of a copy sheet being fed from said storage means when the gripper is at a position on the opposite side of said impression cylinder from said nip.

13. Printing apparatus as set forth in claim 9 in which there is provided at the exit side of said nip a gate for selectively deflecting copy sheets issuing to said nip either to said storing means or to a receiving means for completed sheets.

14. Printing apparatus as set forth in claim 13 in which the receiving means is a collator.

15. Duplicator means comprising:

a printing cylinder and an impression cylinder forming a printing nip having an input side and an exit side;

means for providing a supply of copy sheets and for feeding them seriatim to the printing nip comprising a holder for supporting the copy sheets in substantially norizontal position adjacent the input side of the nip;

means for storing copy sheets as they issue from the printing nip after receiving a first impression thereat;

means for feeding copy sheets out of said storing means towards said impression cylinder;

gripper means on said impression cylinder for grasping the lead margin of copy sheets; and means for actuating said gripper means when approaching said nip to open and close and thereby grasp a sheet being fed from said supply means and carry it through said nip; and means for actuating said gripper means when it is at a location at the opposite side of said impression cylinder from said nip to open and close and thereby grasp a copy sheet being fed from said storing means, and for thereafter preventing actuation of said gripper means until it has passed through said nip.

16. Printing apparatus comprising:

means for printing with wet ink on one side of a sheet at a time, said printing means including a printing element at a printing station through which a sheet passes to receive a first impression;

direct reception hopper means so located as to receive sheets directly from said printing means, said hopper means including means for supporting the sheets in a stack with their first sides having images printed thereon facing in a first direction and second sides on which images are to be printed facing in a second direction, said direct reception hopper means storing the received sheets until the printing run applying said first impression is complete; and sheet feed means operative upon completion of said first printing run for separating one sheet at a time from the impression-free side of the stack of sheets in said hopper means and feeding the thus separated sheets seriatim to said printing station, said sheet feed means including means for moving each sheet in turn first through a turnover path whereby it can present its unprinted face to the printing element and then to said printing station where the second printing impression is received from the printing element on the second side of each such sheet.

17. An apparatus as set forth in claim 16 wherein said hopper means is so constructed that a stack of sheets in said hopper means is accessible top and bottom, wherein sheets received from said printing means are delivered into the top of the hopper means and wherein said sheet feed means feeds sheets from the bottom of the stack in said hopper means to said printing means.

18. An apparatus as set forth in claim 17 in which the printing means also includes an impression cylinder cooperating with said printing element to form a printing nip, and wherein said means for moving each sheet through a turnover path includes the impression cylinder, said impression cylinder being provided with a gripper and means for opening and closing the gripper at a site substantially opposite said printing nip to engage a sheet proceeding from the stack in said hopper.

19. An apparatus as set forth in claim 16 wherein said hopper means is disposed on a first side of said printing means, said apparatus further including means for holding a stack of sheets which are to be printed on, said means for holding a stack of sheets to be printed on being disposed on a second side of said printing means opposite from said first side of said printing means.

20. An apparatus as set forth in claim 18 in which the printing means also includes an impression cylinder cooperating with said printing element to form a printing nip, and wherein said means for moving each sheet through a turnover path includes the impression cylinder, said impression cylinder being provided with a gripper and means for opening and closing the gripper at a site substantially opposite said printing nip to engage a sheet proceeding from the stack in said hopper.

21. An apparatus as set forth in claim 20 in which the impression cylinder and gripper are also provided with means for opening and closing said gripper at a site adjacent said nip for grasping a sheet proceeding from said means for holding a stack of sheets, and means for selectively actuating said gripper at either one site or the other during a printing run.

* * * * *